(No Model.)

H. B. MORAN.
LAMP.

No. 572,122. Patented Dec. 1, 1896.

WITNESSES:
Frank S. Ober
E. L. Nugent

INVENTOR
Hanorah B. Moran
BY
Wm. A. Rosenbaum
ATTORNEY

UNITED STATES PATENT OFFICE.

HANORAH B. MORAN, OF NEW YORK, N. Y.

LAMP.

SPECIFICATION forming part of Letters Patent No. 572,122, dated December 1, 1896.

Application filed January 25, 1896. Serial No. 576,760. (No model.)

*To all whom it may concern:*

Be it known that I, HANORAH B. MORAN, a citizen of the United States, residing at New York, in the county of New York and State of New York, have invented certain new and useful Improvements in Lamps, of which the following is a full, clear, and exact description.

This invention relates to lamps of that class in which a highly-volatile hydrocarbon is converted into a gas by the lamp itself and then supplied to the burner for illuminating or heating purposes.

The object of my invention is to provide a lamp of this character which shall present the appearance of an ordinary lamp, which may be manufactured at low cost and be easily disassembled for the purpose of cleaning and trimming the lamp.

My invention comprehends a lamp basin or reservoir having one or more handles arranged on its sides, one or more of said handles forming a passage for the fuel from the reservoir to the burner and at the same time forming a gas-generating chamber wherein the said fuel is converted from a liquid to a gas and is then delivered to the burner for consumption, the means for so converting the liquid being a box surrounding the handle and containing a second burner, the heat from which is directed against the handle.

In addition to this general plan the invention consists of the details of construction which will be described hereinafter, and particularly pointed out in the claim.

Figure 1:
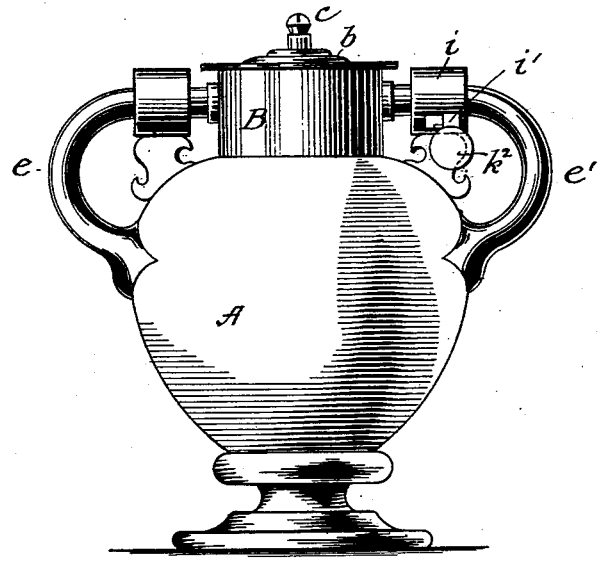
Figure 2:
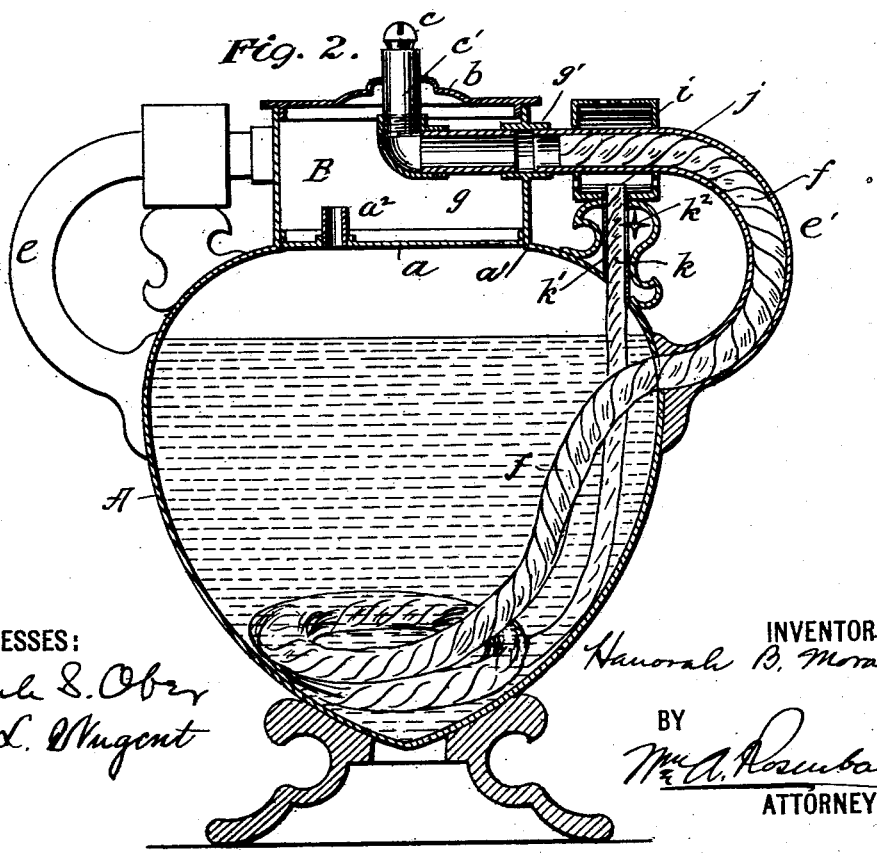

In the accompanying drawings, Figure 1 is a side elevation of my improved lamp, and Fig. 2 is a vertical section of the same.

Referring to the drawings by letter, A represents the basin or reservoir of the lamp. It is closed across the top by a diaphragm $a$. Surmounting the basin is a cylindrical chamber B, covered by an easily-removable cap $b$, having a central perforation through which the burner passes. Upon each side of the lamp I provide two arms or handles $e$ and $e'$. One of these, $e$, is an ordinary handle by which the lamp may be lifted and caried, and the other, $e'$, while serving the ordinary purposes of a handle, is also a passage establishing communication between the basin A and the burner $c$. For this purpose the handle is hollow or tubular, and through it a wick $f$ extends. This wick is coiled in the reservoir and leads thence through the handle and terminates near the point where the handle joins the walls of the chamber B. This passage through the handle is continued to the burner by means of a short length of pipe $g$, which screws into the coupling $g'$. The burner itself is at the end of a short pipe $c'$, which screws into the section $g$.

The upper portion of handle $e'$ is surrounded by an annular chamber formed by a cylindrical box $i$. In the bottom of this chamber a small burner $j$ is provided, which is fed with oil by means of a wick $k$, leading from the main reservoir through a passage $k'$. This wick is adjustable for the purpose of regulating the size of the flame by means of a shaft $k^2$, carrying an ordinary star-wheel that engages with the wick. In the side walls of the annular chamber a sliding door $i'$ is made, through which a lighted match may be passed to ignite the burner $j$. The extreme lower and upper portions of the walls of the annular chamber are perforated to admit air to the small burner and establish a draft through the annular chamber.

A volatile fuel, such as gasolene, naphtha, or kerosene, is used in this lamp. To start the lamp in operation, the small burner $j$ is first lighted. The flame of this impinges directly upon that portion of the hollow handle $e'$ inclosed within the box $i$ and rapidly heats the handle. The liquid fuel which is conveyed from the reservoir by the wick through the handle is rapidly converted into a gas, which flows outward to the burner through the tubes $g$ and $c'$.

Shortly after lighting the burner $j$ a match may be applied to the main burner $c$, and the lamp will then be in full operation. The main flame may be regulated by raising and lowering the small flame at the burner $j$.

In order to extinguish the main flame, it is only necessary to extinguish the small flame at $j$. The main flame will then burn only long enough to consume the gas that may be generated by the stored heat.

To impart a symmetrical appearance to the lamp, handle $e$ should have an enlargement corresponding to the box $i$, and in order to hide the passage $k'$, through which the small wick passes, it may be formed in an ornamental bracket, as indicated in the drawings, a similar ornamental bracket being provided for the other handle.

To remove the main wick, a hook may be passed into the main reservoir through the opening $a'$ and the wick drawn from the tubular handle and from the reservoir. To replace the wick or insert a new one, the cap $b$ is removed. Then the two sections of pipe $c'$ and $g$ are unscrewed. One end of the wick may be then forced through the tubular handle until it projects into the reservoir, when it may be seized by a hook inserted through the opening $a'$ and pulled through to the proper point. The small wick may be easily inserted and removed by reaching through the opening $a'$.

In order to prevent excessive pressure in the reservoir due to the heat conducted from the burners, I provide an open nipple $a^2$ in the diaphragm $a$. This allows the gas to escape from the reservoir into the chamber B, whence it passes through the opening in the cap around the burner and is consumed at the burner.

Obviously my invention is not limited to the exact construction or arrangement of the parts illustrated. The spirit of the invention would be fully carried out if more than one handle was used to convey the fuel; also, the gas-generating portions of the handle may extend throughout the entire length of the handle, if desired, by simply enlarging the box $i$, but I prefer it as shown, because the lower portion of the handle may then be used in lifting the lamp without burning the fingers.

Having thus described my invention, I claim—

In a vapor-lamp, the combination of the lamp-reservoir and the burner, of a handle for the lamp, said handle being tubular and conveying fuel from the reservoir to the burner, a closed box surrounding a portion of said handle and forming an annular heating-chamber therefor, and a second burner located in said box, for the purpose set forth.

In testimony whereof I subscribe my signature in presence of two witnesses.

HANORAH B. MORAN.

Witnesses:
B. M. MORAN,
ROBERT E. LINDSAY.